United States Patent Office 3,740,358
Patented June 19, 1973

3,740,358
HEAT-RESISTANT PHENOLIC FOAM
COMPOSITIONS
Howard W. Christie, Kansas City, Mo., and Thomas J. Byerley, Shawnee Mission, Kans., assignors to Butler Manufacturing Company, Kansas City, Mo.
No Drawing. Continuation-in-part of abandoned application Ser. No. 826,271, May 20, 1969. This application Apr. 14, 1971, Ser. No. 134,062
Int. Cl. C08g 53/10
U.S. Cl. 260—2.5 F           5 Claims

ABSTRACT OF THE DISCLOSURE

A heat-resistant phenolic foam composition comprising a phenol-aldehyde foamable composition containing a phenolic resole, a boron containing compound and an acid catalyst with or without silicic acid and aluminum hydroxide and/or aluminum oxide.

The boron containing compounds specifically set forth in this case are boric acid or boric oxide, and boron-polyol complexes formed by reacting boric acid or boric oxide with a hydroxy organic compound of the group comprising glycerine, sorbitol, mannitol, other sugar alcohols, and aliphatic diols.

The acid catalysts set forth herein are phosphoric acid, hydrochloric, and the combination of phosphoric with trichloroacetic or trifluoroacetic acid which accelerate foaming without degrading heat resistance properties. In the case of the glass forming materials of silicic acid and aluminum hydroxide and/or aluminum oxide, maleic anhydride can be used in place of the acid catalyst.

CROSS-REFERENCE TO RELATED APPLICATIONS

This application is a continuation-in-part of co-pending application Ser. No. 826,271, filed May 20, 1969, now abandoned entitled Heat-Resistant Phenolic Foam Compositions.

BACKGROUND OF THE INVENTION

Field of the invention

The present invention contemplates novel and unique phenolic foam compositions which when exposed to flame will not ignite or punk and in the modification where silicic acid and aluminum oxide or hydroxide are used, a glass will be formed which will give the foam dimensional and mechanical stability.

Description of the prior art

The search for materials resistant to high temperatures has been intensified by a surge in building and increase in production of aircraft, ships, etc., wherein insulation or heat-resistant walls are used and products which can be easily formed and have a measure of heat resistance and fire retardance.

Heretofore, it has been known to prepare some structures from aqueous phenolaldehyde resole resins using an acid catalyst. The reaction is exothermic which converts the water present to steam. The resin is converted to an infusible condition entrapping the steam which forms the cellular structure of the foam. The resin foams produced are inferior in their resistance to heat in that they have an occasionally dramatic tendency to destroy themselves by a punking reaction on exposure to temperatures in excess of 250° F. in the presence of air. By punking is meant the property of continuing to glow, smolder or otherwise combust without a visible flame.

The punking of these foams limits their use as thermal insulation. The addition of conventional flame retarding additives such as organic phosphorus or halogen containing compounds to these foams does not control punking. It has been known to use boric acid and boric anhydride with alpha-hydroxy carboxylic acids such as hydroxyacetic, lactic or oxalic to achieve some measure of nonpunking as set forth in the Quarles Pat. 3,298,973. These acids, however, react with boric acid and boric anhydride to form solids and are, therefore, not fluid slurries and cannot be pumped and metered into the mixing chambers of foam-producing machines. Also, even when using large amounts of boron in lactic acid-catalyzed foams, punking is not completely controlled. It has been set forth in Quarles to use hydrochloric acid with boron compounds in phenolic foams; however, the foams produced were described by Quarles as punking.

It has further been known to use boric acid or boric oxide with hydroxy organic compounds as catalysts in phenol aldehyde resins to produce castings free from voids as set forth in British Pat. 824,251. These catalysts, however, are not capable of producing foams. Further, there has never been any indication that they would have any fire retardant or heat-resistant qualities.

It is apparent, therefore, that there is a need in the industry for heat-resistant phenolic foams which will have a high degree of punk proofness and which are capable of being produced easily and economically.

SUMMARY OF THE INVENTION

It is accordingly one object of the present invention to provide a new heat-resistant phenolic foam which will not punk or burn when exposed to direct flame.

Another object of the invention resides in the provision of novel phenolic foams containing compounds of boron which gives the foam superior resistance to combustion and punking when exposed to flame.

Yet another object of the invention resides in a novel heat-resistant phenolic foam composition containing in addition to a boron containing compound and an acid catalyst, silicic acid and aluminum oxide or hydroxide which gives the foam both superior resistance to combustion and punking and stabilizes the foam dimensionally and mechanically, through the formation of a glass when exposed to flame.

A further object of the invention resides in a novel heat-resistant phenolic foam composition containing a boron compound, maleic anhydride catalyst, silicic acid and aluminum oxide or hydroxide.

A still further object of the invention resides in the provision of a novel high flame and heat-resistant phenolic foam composition because the fire retardants used are liquid or pumpable slurries resulting in more easy and more homogenous dispersion of the fire retardant in the resin and lending themselves to mechanized apparatus and predictability of results.

These and other advantages of the present invention will become apparent from the following detailed description and examples.

In accordance with the above objects, it has been discovered that phenolic foams with high flame and heat resistance can be made by adding to a phenolic resole resin a boron containing compound and a particular acid catalyst.

It has further been found that by adding to the phenolic resole, containing a boron compound and acid catalyst, silicic acid and aluminum oxide or hydroxide, further dimensional and mechanical stability is attained in the foam when exposed to flame due to the formation of a glass.

The boron containing compounds can be boric acid, boric oxide or boron-polyol complexes formed by reacting boric acid or boric oxide with a hydroxy organic compound of the group comprising glycerin, sorbitol, mannitol, other sugar alcohols and aliphatic diols. The boron can be added in various ways. Finely divided boric acid or boric oxide powders can be dispersed in the resole or the boron can be present in soluble forms which are the complexes of boric acid with fluid linear polyols (glycerine, sorbitol, etc.).

The acid catalysts which can be present in amounts of 0.5 to 5 percent of total mixture weight depending upon the particular acid used are hydrochloric, and phosphoric with trichloroacetic or trifluoroacetic acid and phosphoric acid alone.

In the glass forming composition which includes silicic acid and aluminum oxide or hydroxide, the maleic anhydride can be present in amounts of from at least 10 weight percent to 25 weight percent of the total mixture.

The complexes formed between the polyhydroxy compounds and either boric acid or boric oxide, which have been previously described can be present in amounts ranging from at least 13 weight percent to 50 weight percent of the total mixture. Depending upon the particular complex used, these concentrations will provide a minimum of at least equivalent to 1.5 weight percent of boric oxide in the total mixture. Of particular interest are the complex compounds formed with glycerine. They are viscous liquids that at mildly elevated temperatures (50°–80° C.) are sufficiently fluid so that they can be pumped and metered in existing fluid handling equipment.

The boron polyol complex should be present in an amount equivalent to at least 1.5 weight percent of boric oxide in terms of the total mixture weight and when boric acid or boric oxide are used, it should be present in an amount equivalent to at least 7.0 weight percent of boric oxide in terms of the total mixture weight. The boron compound plays any or all of two distinct roles. In the case where a hydrate of silicon dioxide, aluminum hydroxide and/or aluminum oxide is added to a boron compound and acid catalyst system, the boron functions as a glass-former in conjunction with the silica at the elevated temperatures of a flame. In the case of the mineral acids, boron is there only to control punking.

In comparison to foams of the prior art, the foams of the instant invention use much cheaper acids, and are more easily produced in that the boron compounds used are capable of being handled by a foam-producing machine in that they can be introduced into the mixing chamber as a pumpable slurry and mixed therein with the resole. Such a process has much greater utility over prior art foams such as those in the Quarles Pat. 3,298,973 where the $\alpha$-hydroxy acids form high melting complexes with boric acid or boric oxide.

DESCRIPTION OF THE PREFERRED EMBODIMENTS

In accordance with the present invention, there has been found a new material for forming phenolic foams that possesses unusual resistance to heat and punking when exposed to flame. The anti-punking agents used in this process are certain boron containing compounds in combination with certain acid catalysts. The specific boron compounds, acid catalysts and mechanisms by which they react have been set forth above.

The foams produced by this invention can be used in any application where heat and fire resistance is required or desired and more specifically where punk resistance is desired.

Normally phenolic foams undergo combustion in a manner such that normal testing methods are not suitable for distinguishing between the non-burning and nonpunking foams. A.S.T.M. test methods D-1692 and D-653-44, for example, are not intended nor sensitive enough to characterize the nonpunking foams. Consequently, it has been necessary to devise a test to measure that characteristic. The test used is basically a modification of the Butler Chimney Flammability Test for cellular plastics which is described in detail in the Journal of Cellular Plastics, November 1967.

In the modified Chimney Test, the chimney was doubled in cross-sectional dimensions, and a Pyrex glass plate was used as the front observation window. The Tirrill burner was operated at full gas flow with the air mixture adjusted to produce a 1-inch long blue inner cone. The test specimens (1.50–1.75 inches square and at least 4 inches long) were placed in the chimney so that the tip of the flame touched the bottom of the sample. An iron-constantan thermocouple was inserted into the length of the sample to a depth that left 1-inch remaining between the tip of the thermocouple and the bottom of the sample. Flame exposure time was held constant at 300 seconds (5 minutes). The temperature rise was recorded up to a limit of 500° C. using a Leeds and Northrup recorder. The occurrence of any punking was thus quite evident as the initial temperature would exceed 500° C. in a short time. During punking, internal temperatures could reach as high as 1800° F. (980° C.). This test procedure proved to be quite sensitive both to the punking reaction and to the insulating and fire resistance of the foams under test.

The phenolic foam compositions to which the boron compound and the acid catalyst may be added contain a phenolaldehyde resole, a surfactant, a blowing agent, and an accelerator to aid in producing the foam in the phenolaldehyde resole.

Contemplated within the phenolaldehydes that may be used are those prepared by reacting one mole of at least one monohydric phenol selected from the group consisting of phenol (monohydroxy benzene), cresol, xylenol, and cresylic acid with from one to three moles of at least one aldehyde selected from the group consisting of formaldehyde, acetaldehyde, furfuraldehyde, and reactive polymers of formaldehyde such as paraformaldehyde. The reaction preferably is carried out in the presence of substantial quantities of water and in the presence of from 0.5 to 10 percent, based on the weight of the phenol, of one or more alkaline catalysts. Any conventional alkaline catalyst suitable for promoting the reaction of phenol and formaldehyde to give a phenolic resole may be employed. Examples of such catalysts are sodium hydroxide, potassium hydroxide, barium hydroxide, calcium hydroxide, calcium oxide, sodium carbonate, and sodium bicarbonate. It will be appreciated that other alkali and alkaline earth metal oxides, hydroxides, carbonates and bicarbonates may be employed.

The blowing agents that may be used may be any of the halogenated alkanes of any inert volatile agent which will be volatile at about room temperature or 100° C. The accelerator may be any highly reactive substituted phenols such as resorcinol, catechol, cresol, or xylenol.

The addition of small quantities of aqueous solutions of polyvinyl alcohol, although not absolutely required to produce foams, have been found to be effective in maintaining the integrity and cell structure of the foam. Apparently, the polyvinyl alcohol acts, in conjunction with the surface active agent to produce a more stable structure during the time that the foam is rising and has little physical strength. Once the foam has completed its rise sufficient polymerization has occurred to make the foam stable. It has been found that the accelerator, such as resorcinol, can be dissolved in the polyvinyl alcohol solution and then added to the reaction mixture during mixing to insure proper control of stability and retention of cell structure.

The surfactant used for aiding foaming can be any of the nonionic types such as the polyethers and polyalcohols, such as condensation products of alkylene oxides (such as ethylene oxides and propylene oxide) with alkyl phenols, fatty acids, alkyl silanes and silicones and like materials, as is exemplified by such products as octadecyl phenolethylene oxide, decyl phenol-ethylene oxide sulfate and the low polymers of such materials as polyoxyethylene dodecyl phenol, octyl phenol polyethylene glycol ether, recinoleic acid, polyethylene glycolate, stearic acid polyoxyethylene glycolates and similar polyoxyethylated fatty acids and vegetable oils as well as polyoxyethylated fatty acid esters as polyoxyethylene sorbitan monolaurate, polyoxyethylene sorbitan tristearate, polyoxypropylene sorbitan monolaurate, polyoxy (propylene-ethylene) sorbitan monolaurate, and polyoxyethylene sorbitan pentaoleate; polyoxyethylene sorbitan monopalmitate, the siloxane-oxyalkylene block copolymers such as those containing a Si—O—C linkage between the siloxane and oxyalkylene moieties and those containing a Si—C linkage between the siloxane and oxyalkylene moieties. Typical siloxane-oxyalkylene block copolymers contain a siloxane moiety composed of recurring dimethylsiloxy groups end-blocked with monomethylsiloxy and/or trimethylsiloxy groups and an oxyalkylene moiety composed of recurring oxyethylene and/or oxypropylene groups end-blocked with alkoxy groups. Similarly useful are the quaternary ammonium compounds with at least 2 alkyl groups attached to the nitrogen atom like cetyl dimethyl benzyl ammonium chloride, octadecyl dimethyl benzyl ammonium chloride, octadecanol-9-dimethyl ethyl ammonium bromide, and di-isobutylphenoxyethoxy ethyl dimethyl benzyl ammonium chloride and sorbitan fatty acid esters such as sorbitan monolaurate, sorbitan monopalmitate, sorbitan monostearate, sorbitan trioleate and like esters.

The following examples and tests are presented to illustrate the preferred embodiments of the invention but are not to be considered as limitative thereof.

The phenol aldehyde resole resin specifically used in the following examples, hereafter referred in the examples and tables as resole was made by the following procedure.

RESOLE

Liquefied phenol (88 wt. percent in water), 341 g. (300 g. phenol) and 518 g., 37 percent aqueous Formalin (192 g. $CH_2O$) was charged into a 3 liter resin kettle fitted with a stirrer, sampling device, a nitrogen inlet, and condenser. Sodium hydroxide, 6 g. in 40 ml. $H_2O$ was added and the reaction mass brought to 85–90° C. The nitrogen was bubbled through the solution during heating for a period of 1.25 hr. The reaction mass was cooled to 30–40° C. and brought to a pH of 5 with approximately 40 ml. of 10 percent sulfuric acid and then water was removed at 30–40 mm. Hg. Approximately 430 ml. $H_2O$ was removed to produce a resole of 3.0–3.5 wt. percent residual $H_2O$. The temperature of the reaction mass was kept below 60° C. during removal of the $H_2O$. After completion of the water removal the amount of residual $CH_2O$ was determined and found to be 4.0 g./100 cc.; viscosity was 3,960 cps. (Brookfield, No. 3 Spindle, 30 r.p.m.) at 25° C., stroke cure time was 73 sec. at 180° C.

The mole ratio of this example was 2.0 mole $CH_2O$ per mole phenol which will produce a useable resole.

After the product has cooled to 40–50° C., the resin was filtered to remove the residual and insoluble sodium sulfate produced during the neutralization reaction. A light straw colored resole was obtained. Accurate determination of the water content was made using the Karl Fischer method.

The resole can be prepared by reacting at a lower (50° C.) temperature for a longer period or at reflux (94° C.) for a shorter period. It is necessary that the reaction be stopped at a time that will produce a resole of 2.0 to 4.0 wt. percent $H_2O$ with a viscosity (25° C.) of less than 20,000 cps. (less than 10,000 cps. desirable) and a stroke cure time at 180° C. of 50 to 80 sec. Some unreacted formaldehyde will be present in the resole and should be kept under 4.0 g./100 cc. with less and 2.0 g./100 cc. being desirable.

By maintaining the pH of the resole at 5.0 or less the viscosity of the resole does not increase rapidly at room temperatures and is quite stable at 5 to 15° C. The pH of the resole should not be less than 3.0 in order to suppress novolac formation.

FOAMS CONTAINING BORON-POLYOL COMPLEXES AND ACID CATALYSTS

Examples I–IX

Glycerine complexes: A compound referred to in Table I as Boroglycerine glycerite (14% $B_2O_3$) (cf: page 157, Merck Index, 6th edition) was prepared from 31 parts by weight boric acid and 96 parts by weight of glycerine. This complex was prepared by heating the boric acid and the glycerine at 110° C. until boiling stopped, yielding a water clear syrup. A solid 1:1 glycerine-boric acid complex was also prepared (as a solid). It was added to the previously prepared syrup until an extremely viscous mixture was obtained. It was found that a 50:50 mixture of thse two complexes produced a very thick but useable syrup. The mixture was equivalent to 37 percent boric oxide and 63 percent glycerine. This mixture is referred to in Table I as mixed complex (37% $B_2O_3$).

These boroglycerine complexes were used in the foam formulations shown in Table I. The order of mixing was as illustrated by the following description. Thirty gm. of the resole was weighed into 10 oz. paper cup followed by the required number of drops of the surfactant (in this example and all others given in this application General Electric's SF–1109 silicone surfactant was used. SF–1109 is a block copolymer of dimethyl polysiloxane oxide. The polyethylene portion, which is a polyether, is methoxy terminated and represents 75 percent of the copolymer. The silicone portion represents 25 percent of the copolymer. The average molecular weight of this copolymer is 10,000) followed by the blowing agent, $CHCl_3$ and the accelerator and/or polyvinyl alcohol as required. This combination was stirred vigorously for 15 sec. with a high speed air driven propellor type mixer. The boron TABLE I.—BOROGLYCERINE COMPLEXES
[Composition, in parts by weight]

| Ingredient | Example Number— | | | | | | | | |
|---|---|---|---|---|---|---|---|---|---|
| | I | II | III | IV | V | VI | VII | VIII | IX |
| Resole | 100.0 | 100.0 | 100.0 | 100.0 | 100.0 | 100.0 | 100.0 | 100.0 | 100.0 |
| Chloroform | 6.6 | 6.6 | 3.3 | 6.6 | 4.0 | 6.6 | 6.6 | 6.6 | 6.6 |
| Surfactant a | 0.5 | 0.5 | 0.4 | 0.5 | 0.5 | 0.4 | 0.5 | 0.3 | 0.5 |
| Resorcinol | 6.6 | | 6.6 | 6.6 | 13.2 | 6.6 | | c 10.0 | |
| 85% $H_3PO_4$ | 15.0 | | 10.0 | | 10.0 | 8.4 | | 14.0 | |
| 90% trichloroacetic acid | 10.0 | | 10.0 | | 10.0 | 6.7 | | 6.6 | |
| 37% HCl | | | | 5.0 | | | 5.0 | | 2.5 |
| Boroglycerineglycerite (14% $B_2O_3$) | 16.5 | 40.5 | 16.5 | | | | | | |
| Mixed complex (37% $B_2O_3$) | | | | 16.5 | 33.0 | 25.0 | | 15.0 | 33.0 |
| Equivalent percent $B_2O_3$ in total mix | 1.49 | 3.66 | 1.49 | 3.85 | 7.8 | 6.0 | | 3.60 | 7.8 |
| Density, lbs./ft.³ | 4.4 | (d) | 6.0 | 4.5 | 3.6 | 4.1 | 3.2 | ≅4.0 | 3.2 |
| Punk b | No | = | No | No | No | No | Yes | No | No | a General Electric's SF–1109 silicon surfactant.
b Punking test as outlined by Quarles in U.S. 3,298,973, column 2, lines 36–57, tested for minimum of 1 min.
c A mixture of 4 parts by weight resorcinol dissolved in 2 parts by weight of a 15% aqueous solution of Du Pont Elvanol 55–22 polyvinyl alcohol, Elvanol 52–55 is a medium molecular weight polyvinyl alcohol that is cold water soluble, with a viscosity of 21 to 25 cps. at 25° C. in a 4% aqueous solution. Its degree of hydrolysis ranges from 87 to 89%.
d Did not foam.

containing complex and the necessary mineral acids were then mixed thoroughly for 30 sec. The mixture was then placed in an oven at temperatures ranging from 140° F. to 180° F. if required to produce the foam. The HCl catalyzed foam formulation foamed in approximately 60 sec. at room temperature. It should be noted that in Example II no mineral acid was added and no foam was produced. Also, it should be noted that Example VII contained no boron containing complex and that the sample punked to destruction on exposure to the burner flame for one minute. It is thus evident that the presence of these complexes of boron stop the punking reaction and reduce flame damage to the foam structure.

One-inch thick slabs were cut from foam sample, Example VIII, and from a HCl-catalyzed foam containing no boron complexes (control foam). These slabs were exposed to the direct flame of a Tirrill burner with the sample being held 1 inch from the tip of the blue cone of the flame. The exposure time was 60 sec. The following observation was made:

| Sample | Punk | Flame | Depth of char (in.) | Depth of discoloration (in.) |
|---|---|---|---|---|
| Control | Yes | High, yellow | Destroyed | Destroyed. |
| Example VIII foam. | No | Low, green | ⅜ | ½. |

These data indicate that the glycerine-boric acid complex will prevent punking and reduce the flame damage.

Example X

Sorbitol complexes: A sorbitol-boric acid complex was prepared by heating 25 grams of sorbitol with 10 milliliters H$_2$O and 17 grams powdered boric acid until a colorless, mobile liquid was obtained. This complex was not sufficiently acidic to produce foaming and cure of the phenol-formaldehyde resole without addition of strong acids. The following formulation produced a foam that did not punk or burn when exposed to the direct flame of a Tirrill burner for 1 minute:

|  | P.b.w. |
|---|---|
| Resole | 100 |
| Sorbitol-boric acid complex | 50 |
| Resorcinol | 9 |
| PVA-res.[a] | 3 |
| G.E. SF-1109 surfactant | 0.5 |
| Chloroform | 4.5 |
| HCl | 10.5 |

[a] Same mixture describged in footnote (c) in Table I.

The components were added and mixed in the order shown for 40 sec. and then foamed at 175° F. in a forced air oven.

Example XI

Sorbitol-boric acid complexes: A nonpunking foam was produced by using phosphoric acid for the catalyst in a mixture of the following composition:

|  | P.b.w. |
|---|---|
| Resole | 100 |
| PVA-res.[a] | 10 |
| G.E. SF-1109 silicon surfactant | 0.5 |
| Chloroform | 8.0 |
| Sorbitol-boric acid complex (as Ex. X) | 22.0 |
| Phosphoric acid, 85% | 5.0 |

[a] Same mixture described in footnote (c) in Table I.

This mixture was mixed as described in the previous examples and cured at a temperature of 180° F. to yield a 3.6 lb./ft.$^3$ density foam that did not punk on exposure to flame for one minute.

FOAMS CONTAINING EITHER BORIC ACID OR BORIC OXIDE AND MINERAL ACIDS

It has been found that by the incorporation of the proper amounts of either boric acid or boric oxide and mixtures thereof in mineral acid-cured resole foams that the punking resistance and fire resistance of these foams can be dramatically improved. Given in Table III are several examples of mineral acid-cured foams that have been rendered free from the punking reaction by use of boric acid and boric oxide.

It should be noted that Example XIII, a duplicate of Example 2 of Table III in U.S. 3,298,973, and Example XV contain no or less than 2.0 equivalent weight percent of boric oxide in the formulation and that they yield punking foams. These examples show that a mineral acid-cured foam can be made punk-resistant and made to have much better fire resistance by incorporation of a minimum of approximately 7.0 equivalent weight percent of boric oxide in the formulation. The actual compounds can be either powdered boric acid, mixtures of boric oxide, or as the powdered oxide alone. The concentration of the mineral acid used must not exceed approximately 10 parts by weight acid per 100 parts by weight of the resole.

Typical of the methods used in preparing the foams in Table II for evaluation is the following procedure. Thirty gm. of the resole was weighed into a 10-oz. paper cup followed by 4 drops of the SF-1109, 3 gm. CHCl$_3$, and TABLE II.—FOAMS CONTAINING EITHER BORIC ACID OR BORIC OXIDE AND MINERAL ACIDS
[Composition, in parts by weight]

| Ingredient | XII | XIII | XIV | XV | XVI | XVII | XVIII | XIX | XX | XXI |
|---|---|---|---|---|---|---|---|---|---|---|
| Resole | 100 | 100 | 100 | 100 | 100 | 100 | 100 | 100 | 100 | 100. |
| Surfactant [a] | 0.7 | | 0.5 | 0.7 | 0.5 | 0.7 | 0.7 | 0.5 | 0.5 | 0.5. |
| PVA-resorcinol [b] | 10 | | 6.7 | 10 | 6.7 | 10 | 10 | | | 6.7. |
| Chloroform | 16.5 | 10 | 6.6 | 4 | 6.6 | 10 | 15 | | | 6.6. |
| Boric acid-impalpable powder. | 66 | 4 | 20 | | 20 | 66 | 45, +10 B$_2$O$_3$(200 mesh). | 13 B$_2$O$_3$ | 20 B$_2$O$_3$ | 20. |
| Acid | 3.3 HCl | 10 HCl | 5.0 TCA,[d] 5.0 H$_3$PO$_4$ | 3.3 TCA, 3.3 H$_3$PO$_4$ | 1.7 HCl | 3.6 HCl | 1.0 HCl | 1.7 | 1.7 | 3.5 TFA,[e] 5.0 H$_3$PO$_4$. |
| Equivalent percent B$_2$O$_3$ in total mix. | 19.0 | 1.8 | 7.9 | | 8.4 | 19.6 | 18.9 | 11.2 | 16.4 | 7.9. |
| Foam/cure temperature, °F. | 75 | 75 | 180 | 145 | 75 | 75 | 75 | 75 | 75 | 145. |
| Density, lbs./ft.$^3$ | 4.9 | 2.1 | ≅4.0 | ≅3.0 | ≅3.0 | 2.4 | 4.8 | 3.7 | 3.5 | 4.3. |
| Punk [c] | No | Yes | No | Yes | No | No | No | No | No | No. |

[a] General Electric's SF-1109 silicone surfactant.
[b] Same mixture described in footnote to Table I.
[c] Modified Butler Chimney Flammability Test as described previously in this application.
[d] Trichloroacetic acid.
[e] Trifluoroacetic acid.

3 gm. of the PVA-resorcinol mixture. These components were then stirred vigorously for approximately 15 sec. Twenty gm. of $H_3BO_3$, impalpable powder, and 1 gm. of 37% HCl was added, stirred into the previous mixture for 30 sec. Foaming started in 60 sec. and was completed in 120 sec.

Example XXII

A foam was prepared using a combination of boric acid and boric oxide. To 30 g. of resin was added 14 g. impalpable boric acid powder, 3 g. of 200-mesh boric oxide, 4 drops SF–1109, 3 g. resorcinol-polyvinyl alcohol solution at a 2:1 ratio, 3 ml. of chloroform and 10 drops of 37% hydrochloric acid. This material foamed faster than the above examples and had a core density of 3.45 lb./ft.$^3$. In the chimney test, the test specimen did not punk or burn and showed very little char damage. Temperature at the thermocouple after 5 min. was 300° C. and temperature started to descend 44 sec. after flame was removed.

phenolic foams have been unattractive due either to the low resistance of phenolic foams to punking from heat and flame or to the cost and manipulative problems associated with known means of preventing punking.

Having thus described the compositions of the invention in terms of their preferred embodiments as set forth in the description and examples of the aforesaid specification, it is apparent to those skilled in the art that various changes and modifications can be made in these compositions without departing from the spirit and scope of the invention.

Thus, for example, it is apparent that although only silicic acid, aluminum hydroxide and aluminum oxide have been set forth above, other metal oxides and hydroxides normally used in the production of glasses with boric acid or anhydride can be used. In this respect, it is contemplated that any compositions which form a glass below 1700° F. will be useful in this invention.

TABLE III.—PHENOLIC FOAM CONTAINING LARGE AMOUNTS OF INORGANICS

| Example number | HCl (phr.) | Maleic anhydride (phr.)[1] | $H_3BO_3$[2] (phr.) | $B_2O_3$ 200 mesh (phr.) | $SiO_2\text{-}XH_2O$ 100 mesh (phr.) | $Al(OH)_3$ powder (phr.) | Core density (lbs./ft.) | Temp., °C. (5 minutes) | Temp., °C. maximum | Turn around (seconds) | Depth of char (inch) |
|---|---|---|---|---|---|---|---|---|---|---|---|
| XXIII | 4.0 | | 71.0 | | 20.0 | 20.0 | ≅8 | 185 | 205 | 40 | 0.15 |
| XXIV | 3.0 | | 33.3 | 6.7 | 33.3 | 33.3 | ≅10 | 98 | 102 | 23 | 0.2 |
| XXV | | 33.3 | 33.3 | 6.7 | 33.3 | | 4.35 | 397 | 414 | 21 | 0.25 |
| XXVI | | 33.3 | 33.3 | 6.7 | 33.3 | 33.3 | 7.1 | 107 | 153 | 175 | 0.2 |
| XXVII | | 33.3 | 33.3 | 6.7 | 33.3 | | 2.28 | 470 | 478 | 30 | 0.12 |
| XXVIII | | 33.3 | 33.3 | 6.7 | 33.3 | 33.3 | 3.29 | 450 | 483 | 50 | 0.5 |
| XXIX | | 33.3 | 33.3 | 33.3 | 33.3 | 33.3 | 6.68 | 172 | 211 | 130 | 0.12 |
| XXX | | 33.3 | 60.0 | 6.7 | 33.3 | 33.3 | 5.43 | 227 | 227 | 298 | 0.12 |

[1] phr.=Per hundred parts of resole, by weight.
[2] Boric acid, impalpable powder.

Examples XXIII and XXIV

A premix was formulated containing the following additives in parts per hundred parts of resole resin (phr.): 10 phr. resorcinol-polyvinyl alcohol solution 2:1, 1 phr. G.E. silicone surfactant SF–1109 (Example XXIII 4.0 phr. hydrochloric acid, Example XXIV 3.0 phr. hydrochloric acid), and 7.2 phr. chloroform. To this premix was added the inorganic oxides and silicic acid as shown in Table III. The mixture was stirred vigorously for 40 sec. and foamed at 150° F. in a forced-air oven. The foam was set 5 to 7 min. from start of mixing.

Examples XXV to XXX

The premix was formed in the same way as Examples XXIII and XXIV except that the acid catalyst is replaced by 33.3 phr. melted maleic anhydride. Foams XXVII and XXVIII were duplicated to observe the effect of a post cure of 400° F. for 1 hr. Foams Nos. XXIX and XXX were also post cured at 400° F. for 1 hour. All the specimens showed only slight damage in the chimney test with no flame or smoke and no punking. The exposed surfaces of the tested specimens were also characterized by the presence of a hard, glossy material, indicating that a glass had been formed from the mixed oxides. Previously described specimens made with only boron oxide but without other inorganic oxides did not have the hard, glazed surface after being exposed to a flame. The glass forming composition can be present in an amount of from 10% to 60% of the total composition weight. The silicic acid can be present in an amount of from 5% to 30% of the total composition weight.

As has been set forth above and evidenced by the specific examples, novel heat-resistant phenolic foams have been produced which are capable of being used in structural and insulating applications. Such uses for

We claim:

1. A heat-resistant, phenolic foam-forming composition consisting essentially of a phenolic resole resin, at least 7 equivalent percent of $B_2O_3$ by weight of total mixture of a boron compound selected from the group consisting of boric acid and boric oxide and from 0.5% to 5% by weight of total mixture of hydrochloric acid.

2. The composition of claim 1, wherein the resole resin contains a surfactant, a blowing agent and an accelerator.

3. The composition of claim 1, wherein there is added from 10–60 weight percent of total mixture of an inorganic composition which forms a glass below 1700° F. consisting essentially of silicic acid and a metal oxide.

4. The composition of claim 3, wherein the silicic acid is present in amounts of from 5 to 30 weight percent of total mixture.

5. The composition of claim 3, wherein the metal oxide is from the group consisting of aluminum oxide and aluminum hydroxide.

References Cited

UNITED STATES PATENTS 3,124,542  3/1964  Kohn _____ 260—2.5 D
3,298,973  1/1967  Quarles et al. _____ 260—2.5 F

FOREIGN PATENTS 824,251  11/1959  Great Britain _____ 260—59

JOHN C. BLEUTGE, Primary Examiner

M. FOELAK, Assistant Examiner

U.S. Cl. X.R.

260—2.5 FP, 45.7 R, 57 R, 59, Dig. 24